(12) United States Patent
Bergström et al.

(10) Patent No.: US 9,769,805 B2
(45) Date of Patent: Sep. 19, 2017

(54) USER EQUIPMENT, A RADIO BASE STATION AND RESPECTIVE METHOD THEREIN FOR MANAGING UPLINK RESOURCES WITHIN A COVERAGE AREA OF THE RADIO BASE STATION

(75) Inventors: Andreas Bergström, Vikingstad (SE); Kristofer Sandlund, Luleå (SE); Rui Fan, Beijing (CN); Qianxi Lu, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 325 days.

(21) Appl. No.: 14/391,507

(22) PCT Filed: Apr. 12, 2012

(86) PCT No.: PCT/SE2012/050392
§ 371 (c)(1),
(2), (4) Date: Oct. 9, 2014

(87) PCT Pub. No.: WO2013/154475
PCT Pub. Date: Oct. 17, 2013

(65) Prior Publication Data
US 2015/0078231 A1    Mar. 19, 2015

(51) Int. Cl.
*H04W 72/00* (2009.01)
*H04W 72/04* (2009.01)
(Continued)

(52) U.S. Cl.
CPC ....... *H04W 72/0413* (2013.01); *H04L 1/1887* (2013.01); *H04L 5/0057* (2013.01);
(Continued)

(58) Field of Classification Search
None
See application file for complete search history.

(56) References Cited

U.S. PATENT DOCUMENTS

2002/0132611 A1* 9/2002 Immonen .............. H04W 28/16
455/414.1
2010/0157895 A1    6/2010 Pani et al.
(Continued)

FOREIGN PATENT DOCUMENTS

EP    1643690 A1    4/2006

OTHER PUBLICATIONS

Renesas Mobile Europe Ltd, "R1-120366: On HARQ-ACK and Periodic CSI Multiplexing in PUCCH Format 3," 3rd Generation Partnership Program (3GPP), TSG RAN WG1 Meeting #68, Feb. 6-10, 2012, Dresden, Germany, 3 pages.
(Continued)

*Primary Examiner* — Hassan Phillips
*Assistant Examiner* — Gautam Sharma
(74) *Attorney, Agent, or Firm* — Withrow & Terranova, PLLC

(57) ABSTRACT

A UE, an RBS and respective methods therein for managing uplink resources from an RBS in a wireless communication network are provided. The method in the UE comprises determining that uplink resources are needed, and determining which type of service for which the uplink resources are needed. The method further comprises transmitting, to the RBS, a scheduling request for a scheduling grant, the scheduling request comprising an indication of the type of service for which the scheduling grant is requested.

44 Claims, 10 Drawing Sheets

(51) Int. Cl.
- H04W 72/12 (2009.01)
- H04L 1/18 (2006.01)
- H04L 5/00 (2006.01)
- H04W 52/02 (2009.01)

(52) U.S. Cl.
CPC ... *H04W 52/0216* (2013.01); *H04W 72/0486* (2013.01); *H04W 72/1242* (2013.01); *H04W 72/1268* (2013.01)

(56) References Cited

U.S. PATENT DOCUMENTS

| | | | | |
|---|---|---|---|---|
| 2012/0026957 A1* | 2/2012 | Cai | H04L 1/1671 | 370/329 |
| 2012/0069793 A1* | 3/2012 | Chung | H04B 7/15542 | 370/315 |
| 2012/0100864 A1* | 4/2012 | Susitaival | H04L 1/188 | 455/450 |
| 2012/0213187 A1* | 8/2012 | Yang | H04L 1/0027 | 370/329 |
| 2012/0302274 A1* | 11/2012 | Ohta | H04W 72/042 | 455/509 |
| 2012/0320848 A1* | 12/2012 | Chen | H04L 5/0055 | 370/329 |
| 2013/0208665 A1* | 8/2013 | Baldemair | H04L 1/0031 | 370/329 |

OTHER PUBLICATIONS

Author Unknown, "R2-101847: LS on UE-Specific UL CC for PUCCH Transmissions with Carrier Aggregation," 3rd Generation Partnership Program (3GPP), TSG RAN WG2 Meeting #69, Feb. 22-26, 2010, San Francisco, CA, 1 page.

Author Unknown, "Technical Specification Group Radio Access Network; Evolved Universal Terrestrial Radio Access (E-UTRA); Physical layer procedures (Release 10)," Technical Specification 36.213, Version 10.2.0, 3GPP Organizational Partners, Jun. 2011, 120 pages.

International Search Report and Written Opinion for PCT/SE2012/050392, mailed Sep. 19, 2012, 13 pages.

* cited by examiner

USER EQUIPMENT, A RADIO BASE STATION AND RESPECTIVE METHOD THEREIN FOR MANAGING UPLINK RESOURCES WITHIN A COVERAGE AREA OF THE RADIO BASE STATION

This application is a 35 U.S.C. §371 national phase filing of International Application No. PCT/SE2012/050392, filed Apr. 12, 2012, the disclosure of which is incorporated herein by reference in its entirety.

TECHNICAL FIELD

The present disclosure relates to resource management in a radio access network and in particular to management of uplink resources within a coverage area of a radio base station.

BACKGROUND

Wireless communication systems comprise, in general, a radio access network. The radio access network comprises a plurality of Radio Base Stations, RBSs, which act as access points for User Equipments, UEs. A UE wanting to make use of a service provided by the wireless communication system, or wireless communication network, does so via an RBS to which the UE is currently connected.

An RBS has a coverage area associated to it, which is also referred to as a cell. It shall be noted that the coverage area of the RBS may comprise a plurality of cells and not just one. However, hereinafter, the coverage area of the RBS is referred to as a cell, or the cell, and it shall be understood that a/the cell may be a plurality of cells. In general, any UE being located within a cell of a specific RBS will be provided with service via this specific RBS.

The very nature of a wireless communication network is that UEs move about resulting in a varying number of UEs being connected to individual RBSs over time. Furthermore, depending on the time of day, the amount of traffic, also referred to as load, generated by the varying number of UEs in individual RBSs vary quite substantially. This results in substantial load level variations in individual RBSs over time.

Most operators of wireless communication networks strive to be able to meet the highest demands on traffic load levels. In other words, at so called peak hours where the traffic load is at its highest, the number of UEs not being provided with service should be minimised. One way to make sure that no UE is ever denied service is to over-dimension the radio access network. Such a solution is very costly and will result in a lot of capacity being wasted at times other than during peak hours, thus the solution is not preferable.

Another solution is to make prioritisations within the RBS between the incoming traffic in situations of high traffic load. One solution has been to categorise different UEs in a way that some UEs are associated with high priority and some with low priority. In such a solution, in case the traffic load reaches a relatively high level such that the RBS needs to start making prioritisations, high priority UEs are prioritised, or favoured, before low priority UEs.

In such a solution, a high priority UE may e.g. pay more for his/her subscription compared to a low priority UE. However, the solution with high and low priority UEs suffers some drawbacks. The high priority UE may make use of a service not being time critical, thereby not needing to be prioritised. At the same time, a low priority UE may want to make use of a service being time critical, thereby needing to be prioritised. Since the high priority UE will be favoured compared to the low priority UE, the low priority UE may be denied service due to high traffic load even though the high priority UE would not be affected by his/her service being somewhat delayed.

SUMMARY

The object is to obviate at least some of the problems outlined above. In particular, it is an object to provide a UE, an RBS and respective methods therein for managing uplink resources from an RBS in a wireless communication network, wherein the UE is enabled to indicate to the RBS, which type of service the UE requests when the UE sends a scheduling request to the RBS. These objects and others may be obtained by providing a UE, an RBS, a method in a UE and a method in an RBS according to the independent claims attached below.

According to an aspect a method in a UE for requesting uplink resources from an RBS in a wireless communication network is provided. The method comprises determining that uplink resources are needed, and determining which type of service for which the uplink resources are needed. The method further comprises transmitting, to the RBS, a scheduling request for a scheduling grant, the scheduling request comprising an indication of the type of service for which the scheduling grant is requested.

According to an aspect, a method in an RBS for managing uplink resources within a coverage area of the RBS is provided. The method comprises receiving, from a UE a scheduling request comprising an indication of which type of service for which the scheduling grant is needed, and determining a current uplink resource usage of the RBS. The method also comprises determining a current uplink resource usage of the RBS, and transmitting a scheduling grant to the UE, if uplink resources can be assigned to the UE.

According to still an aspect, a UE adapted to request uplink resources from an RBS in a wireless communication network. The UE comprises a determining module adapted to determine that uplink resources are needed and which type of service for which the uplink resources are needed, and a transmitting module adapted to transmit, to the RBS, a scheduling request for a scheduling grant, the scheduling request comprising an indication of the type of service for which the scheduling grant is requested.

According to yet an aspect, an RBS adapted to manage uplink resources within a coverage area of the RBS. The RBS comprises a receiving module adapted to receive, from a UE a scheduling request comprising an indication of which type of service for which the scheduling grant is needed. The RBS also comprises a determining module adapted to determine a current uplink resource usage of the RBS, and to determine, based on the indication in the scheduling request and the current uplink resource usage, if uplink resources can be assigned to the UE. Further, the RBS comprises a transmitting module adapted to transmit a scheduling grant to the UE, if uplink resources may be assigned to the UE.

The UE, the RBS and the respective methods therein have several advantages. By providing the RBS with the indication of the type of service for which the scheduling grant is requested, the RBS is enabled to make prioritisations between a plurality of incoming scheduling requests from different UEs. This may be particularly useful in situations where the load in the RBS is relatively high, wherein the RBS cannot simply grant all incoming requests from different UEs. By knowing the type of service for which the scheduling request is received, the RBS is enabled to determine e.g. how time critical the service is and then prioritise scheduling requests referring to relatively time critical services as compared to scheduling requests referring to services not being relatively time critical. In this manner, the RBS is enabled to make scheduling decisions for the benefit of both the wireless communication network in which the RBS is deployed as well as end-user performance. By the load being relatively high is meant that the load is close to a maximum capacity of the RBS which results in that the RBS must start making prioritisations among the incoming scheduling requests.

BRIEF DESCRIPTION OF DRAWINGS

Embodiments will now be described in more detail in relation to the accompanying drawings, in which.

DETAILED DESCRIPTION

Briefly described, a UE, an RBS and respective methods therein for uplink resource management are provided, wherein the UE requesting uplink resources indicates to the RBS which type of service for which the uplink resources are needed.

The UE and the RBS may be implemented in an access network supporting Long Term Evolution, LTE, technology.

Exemplifying embodiments of a method in a UE for requesting uplink resources from an RBS will now be described with reference to FIG. 1a, which is a flowchart of the method in the UE for requesting uplink resources from the RBS.

Figure 1A:
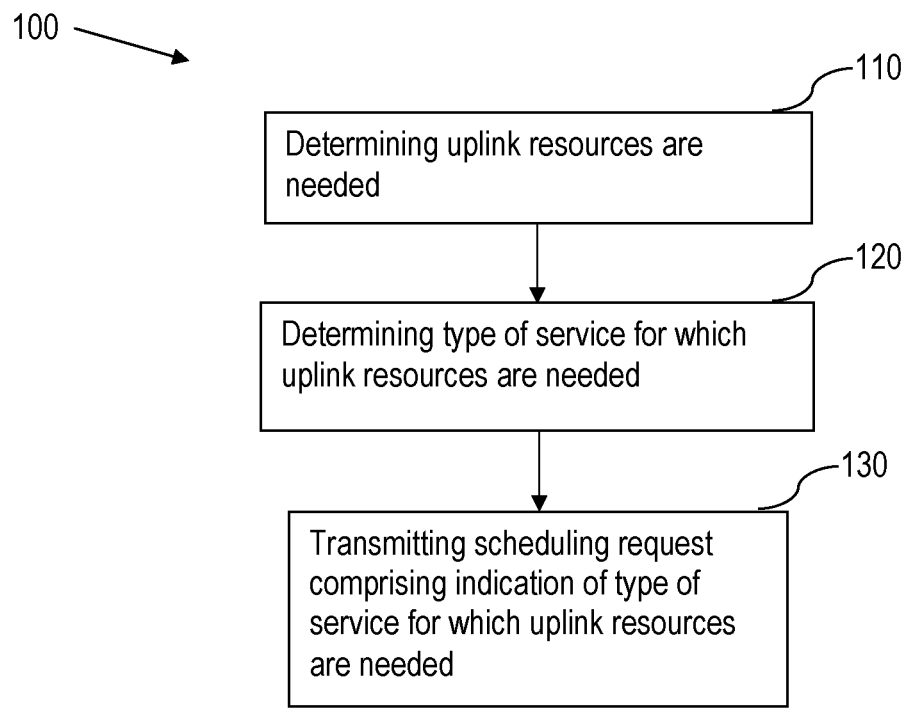
FIG. 1a is a flowchart of a method in a UE for requesting uplink resources from an RBS according to an exemplifying embodiment.

FIG. 1a illustrates the method 100 comprising determining 110 that uplink resources are needed, and determining 120 which type of service for which the uplink resources are needed. The method further comprises transmitting 130, to the RBS, a scheduling request for a scheduling grant, the scheduling request comprising an indication of the type of service for which the scheduling grant is requested.

The UE is located in a coverage area of the RBS. The coverage area is also referred to as the cell of the RBS. Note that the term "the cell" may comprise a plurality of cells. The UE may already be connected to the RBS, or it may be located in the cell but not yet connected to the RBS.

At one point in time, the UE determines 110 that uplink resources are needed, and the UE also determines which type of service for which the uplink resources are needed. There are many different examples of services for which uplink resources are required. Some examples are transmitting of user-plane data, Voice-Over-IP, VoIP, best effort file transfer, and so on.

In case the UE is not already connected to the RBS, the UE first connects to the RBS so that the UE may become served by the RBS. In LTE, this corresponds to the UE being in Radio Resource Control, RRC, CONNECTED mode, wherein the UE is synchronised with the RBS.

Once the UE is connected to the RBS and the UE has determined both that uplink resources are needed and the reason why the uplink resources are needed, i.e. which type of service for which the uplink resources are needed, the UE transmits a scheduling request for a scheduling grant to the RBS. In the scheduling request, the UE inserts, or sets, an indication of the type of service for which the scheduling grant is requested.

The method has several advantages. By providing the RBS with the indication of the type of service for which the scheduling grant is requested, the RBS is enabled to make prioritisations between a plurality of incoming scheduling requests from different UEs. This may be particularly useful in situations where the load in the RBS is relatively high, wherein the RBS cannot simply grant all incoming requests from different UEs. By knowing the type of service for which the scheduling request is received, the RBS is enabled to determine e.g. how time critical the service is and then prioritise scheduling requests referring to relatively time critical services as compared to scheduling requests referring to services not being relatively time critical. In this manner, the RBS is enabled to make scheduling decisions for the benefit of both the wireless communication network in which the RBS is deployed as well as end-user performance. By the load being relatively high is meant that the load is close to a maximum capacity of the RBS which results in that the RBS must start making prioritisations among the incoming scheduling requests.

In an example, the indication comprises information on a logical channel group comprising a set of logical channels with similar quality of service characteristics or a priority level of the service.

Different services may be associated with different priority level of service. Some services may be relatively time critical whereas others may be relatively less time critical. By the term "relatively" in this context is meant that all the different available services have different demands on delay, some services accept no delays at all, thereby being time critical. Other services are more indifferent to delays, thereby not being time critical. In other words, there can be said to be a scale ranging from the most time critical to the least time critical. Merely as an example, assume that there are ten different levels in this scale ranging from 1 to 10, wherein 1 is the most time critical level and 10 the least time critical level. Then a service being "relatively" time critical is of a level closer to 1 than to 10.

One example of associating different priority levels with different services is to assign the most time critical of the available services with the highest priority, then the second most time critical of the available services with the second highest priority and so on, down to assigning the least time critical of the available services with the lowest priority.

Different services may also be associated with different quality of service. Some services may have relatively high demands on quality of service whereas others may have relatively low demands on quality of service. The definition of the term "relatively" in this context corresponds to the definition with regard to a service being relatively time critical.

In an example, the method comprises sending the scheduling request on a scheduling request resource of a Physical Uplink Control Channel, PUCCH, as an extended scheduling request message having a structure of a HARQ feedback message.

In general, the PUCCH has different resources, whereof the scheduling request resource is one. The UE sends the scheduling request on this scheduling request resource of the PUCCH as an extended scheduling request message having a structure of a HARQ feedback message.

In yet an example, the method further comprises sending the extended scheduling request message on the scheduling request resource of the PUCCH using standardised PUCCH format 1a or 1b.

There are different standardised PUCCH formats whereof 1a and 1b are two different formats. PUCCH format 1a comprises one explicit bit and PUCCH format 1b has two explicit bits. There is also a PUCCH format 1 which has no bits but the information is carried by the presence/absence of transmission of PUCCH from the UE.

With PUCCH format 1a, the explicit bit is used to indicate, to the RBS, which type of service for which the uplink resources are needed. Since there is only one bit and this bit can have two different values "0" or "1", the indication can take two values.

With PUCCH format 1b, the explicit two bits may be used to indicate, to the RBS, which type of service for which the uplink resources are needed. Since there are two bits, each being able to take the two different values "0" or "1", the indication can take four values.

As can be seen above, with PUCCH format 1b, the indication may be more diverse if both bits are used as compared to PUCCH format 1a.

The RBS, or higher layer nodes, determine the definition of the different bits of PUCCH format 1a and 1b, and how they are to be used by the UE to indicate the type of service for which the scheduling grant is requested. The definition or definitions of the different bits of PUCCH format 1a and 1b are communicated to the UE by means of e.g. RRC configuration procedures, RRC signalling, a system information message, broadcasting and so on.

Figure 1B:
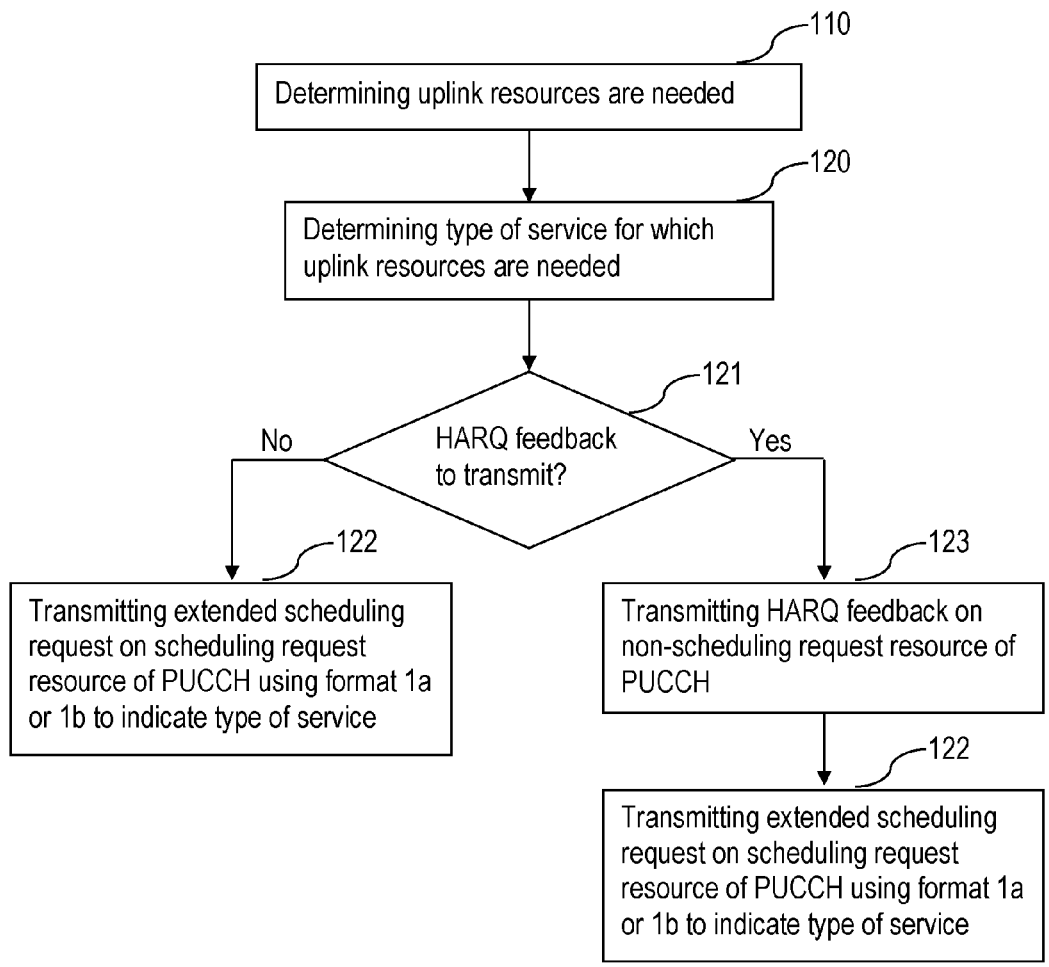
FIG. 1b is a flowchart of a method in a UE for requesting uplink resources from an RBS according to an exemplifying embodiment.

In still an example illustrated in FIG. 1b, if the UE does not have HARQ feedback to transmit to the RBS, then the method comprises transmitting 122 the extended scheduling request message on the scheduling request resource of the PUCCH using standardized PUCCH format 1a or 1b wherein at least one bit of the extended scheduling request message is used to indicate the type of service for which the scheduling grant is requested.

In case the UE does not have any HARQ feedback to transmit to the RBS, the UE transmits 122 the extended scheduling request message on the scheduling request resource of the PUCCH using standardized PUCCH format 1a or 1b wherein at least one bit of the extended scheduling request message is used to indicate the type of service for which the scheduling grant is requested as described above.

In another example, wherein if the UE has HARQ feedback to transmit to the RBS, then the method comprises transmitting 123 a HARQ feedback on a non scheduling request resource of the PUCCH and thereafter transmitting 122 the extended scheduling request message on the scheduling request resource of the PUCCH using standardized PUCCH format 1a or 1b.

As described above, the PUCCH has different resources, whereof the scheduling request resource is one. There may be several other resources of the PUCCH, all of which are referred to as non scheduling request resource for sake of simplicity. In case the UE has HARQ feedback to transmit to the RBS, the UE first transmits the HARQ feedback. Since the HARQ feedback is not a scheduling request, the HARQ feedback is transmitted on the non scheduling request resource of the PUCCH. Thereafter, the UE transmits the extended scheduling request message on the scheduling request resource of the PUCCH using standardized PUCCH format 1a or 1b. This results in a small delay for sending the scheduling request, but no delay in sending the HARQ feedback to the RBS.

Figure 1C:
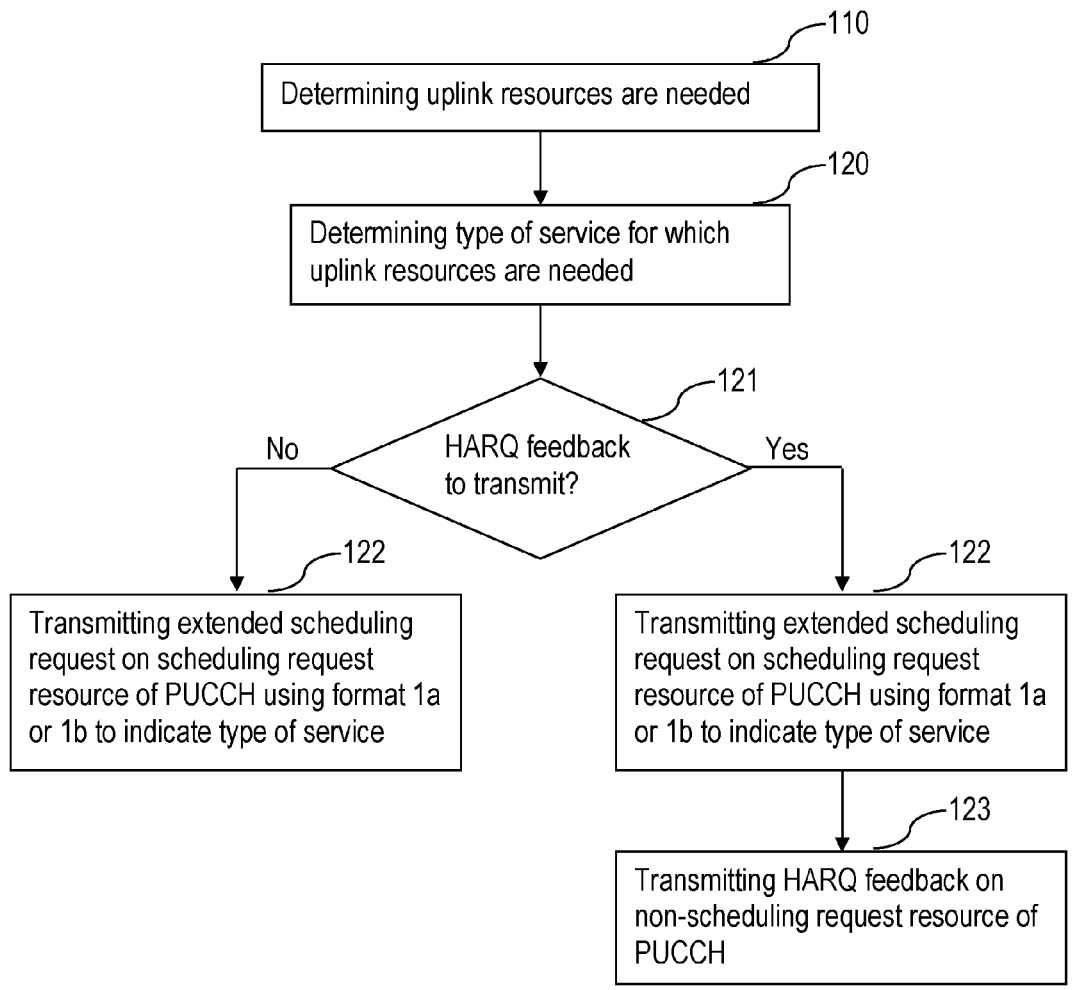
FIG. 1c is a flowchart of a method in a UE for requesting uplink resources from an RBS according to an exemplifying embodiment.

In an example illustrated in FIG. 1c, wherein if the UE has HARQ feedback to transmit to the RBS, then the method comprises first transmitting 122 the extended scheduling request message on the scheduling request resource of the PUCCH using standardized PUCCH format 1a or 1b and thereafter transmitting 123 a HARQ feedback message on a non scheduling request resource of the PUCCH.

In this manner, the UE can be said to prioritise the scheduling request by first transmitting the extended scheduling request message on the scheduling request resource of the PUCCH using standardised PUCCH format 1a or 1b. This results in no delay for transmitting the scheduling request. Once the extended scheduling request message is transmitted, the UE transmits the HARQ feedback message on a non scheduling request resource of the PUCCH, resulting in a small delay for sending the HARQ feedback to the RBS.

Figure 1D:
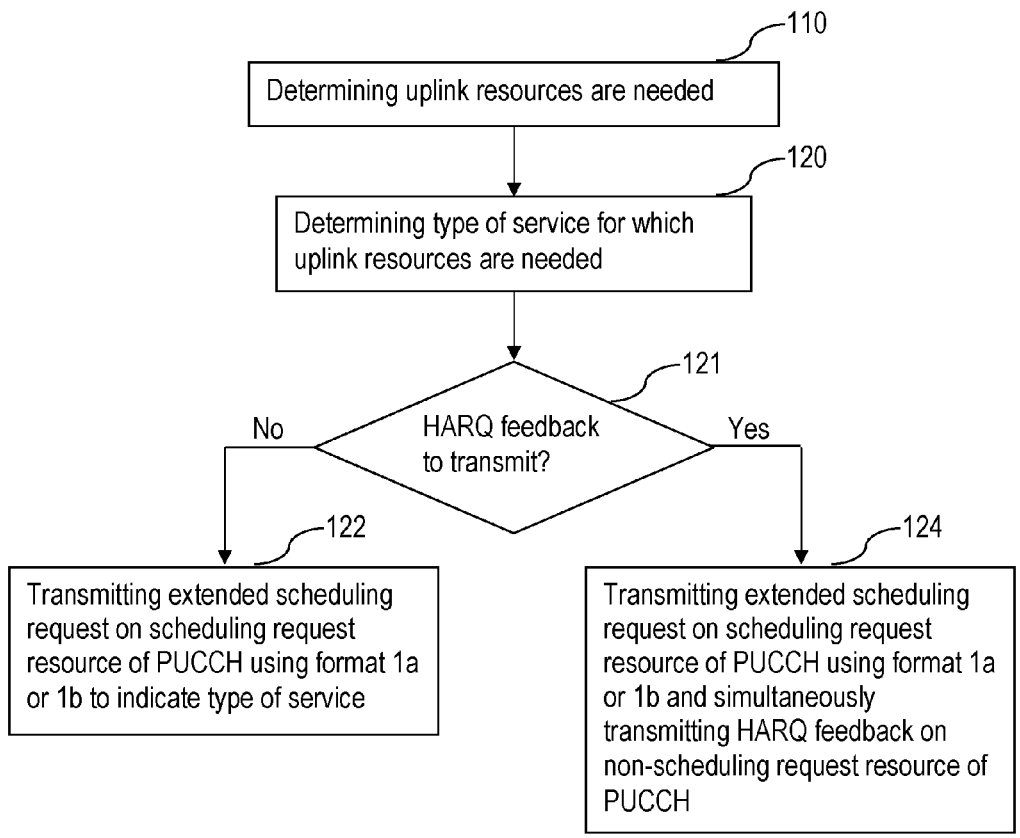
FIG. 1d is a flowchart of a method in a UE for requesting uplink resources from an RBS according to an exemplifying embodiment.

In still another example illustrated in FIG. 1d, wherein if the UE has HARQ feedback to transmit to the RBS, then the method comprises transmitting 124 the extended scheduling request message on the scheduling request resource of the PUCCH using standardized PUCCH format 1a or 1b simultaneously as transmitting a HARQ feedback on a non scheduling request resource of the PUCCH.

This solution will ensure minimum delay for both the scheduling request and the HARQ feedback. However, this solution will require the scheduling request resource of the PUCCH and the non scheduling request resource of the PUCCH to be adjacent in frequency due to Discrete Fourier Transform, DFT, spread Orthogonal Frequency-Division Multiplexing, OFDM, uplink.

Figure 1E:
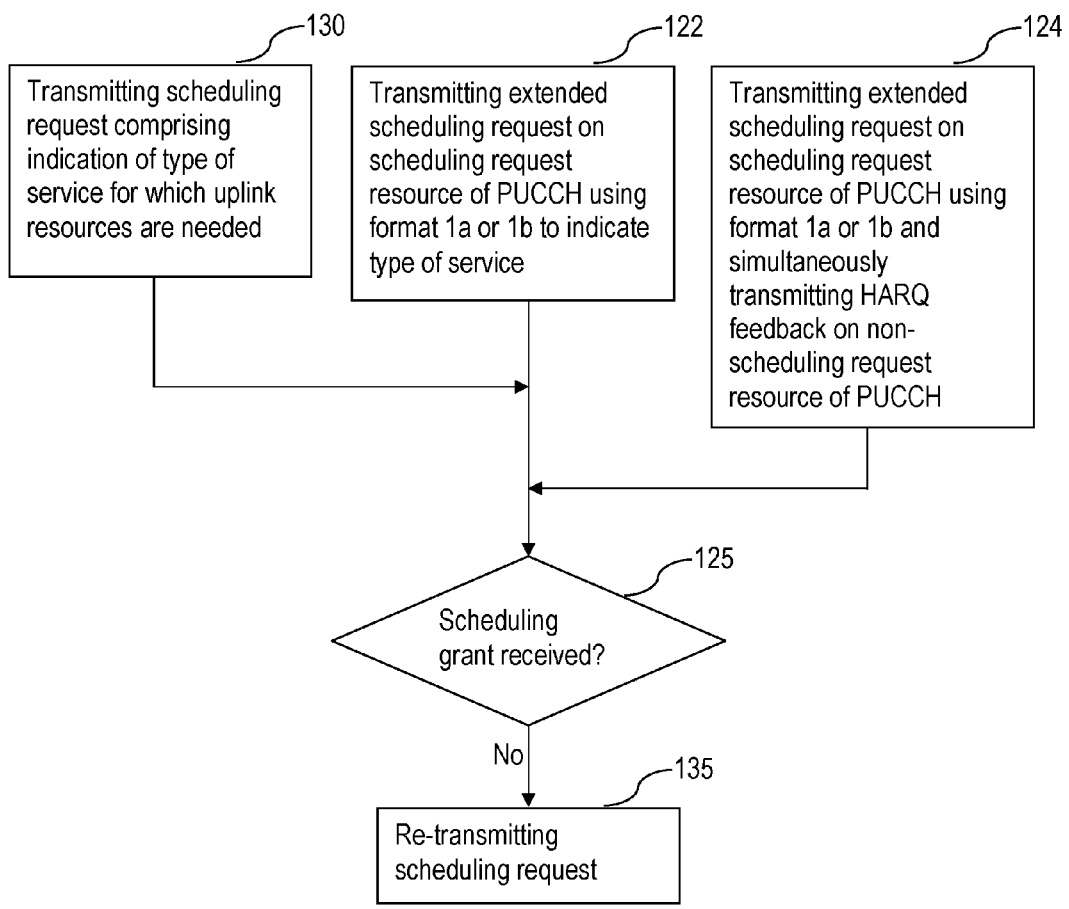
FIG. 1e is a flowchart of a method in a UE for requesting uplink resources from an RBS according to an exemplifying embodiment.

In an example illustrated in FIG. 1e, the method further comprises retransmitting 135 the scheduling request in case no scheduling grant is received from the RBS.

After sending a scheduling request, the UE expects to receive a scheduling grant. The UE keeps track of the time passed from the transmission of scheduling request. Merely as an example, the UE starts an internal timer which has a predetermined running time. Once the timer expires, the UE assumes the scheduling request to have been lost or not granted for other reasons and retransmits the scheduling request to the RBS.

In still an example, a default value is defined for the UE, the default value relating to a priority level of service, wherein the extended scheduling request message on the scheduling request resource of the PUCCH indicates a deviation from the default value.

Once the UE becomes connected to the RBS, the RBS assigns a default value for the UE relating to a priority level of service. The RBS informs the UE of the default value that the RBS has assigned to the UE. The RBS may perform the information of the UE by means of e.g. RRC configuration procedures, RRC signalling, a system information message, broadcasting and so on.

The default value means that if a UE transmits a scheduling request without indicating which type of service for which the uplink resources are needed, the RBS applies the default value to the received scheduling request. Likewise, if the UE, having been informed of its assigned default value, needs to request a scheduling grant for a service having a priority level of service corresponding to the default value, the UE may simply transmit, or send, the scheduling request without any indication.

However, in case the UE needs to request a scheduling grant for a service having a priority level of service not corresponding to the default value, the UE transmits, or sends, the extended scheduling request message wherein the indication indicates a deviation of the default value.

The default value may be set to correspond to the lowest priority level of service, wherein the deviation indicates a higher priority level of service. For this purpose, PUCCH format 1a may be used wherein the one bit being set to "1" indicates the deviation from the default value, i.e. in this case a higher priority level of service.

The default value may be set to correspond to the highest priority level of service, wherein the deviation indicates a lower priority level of service. For this purpose, PUCCH format 1a may be used wherein the one bit being set to "1" indicates the deviation from the default value, i.e. in this case a lower priority level of service.

The default value may be set to correspond to a priority level of service being somewhere in the middle between the lowest and the highest possible levels. In such a case, using e.g. PUCCH format 1a, the one bit being set to "1" indicates a deviation corresponding to a higher priority level of service and the one bit set to "0" indicates a deviation corresponding to a lower priority level of service.

Alternatively, the default value is set, in the RBS, to correspond to the latest indication of which type of service for which the scheduling grant is needed. This means that only when the UE requests a scheduling grant for a service having a different priority level of service or level of quality of service than a previous sent, or transmitted, scheduling request, the UE includes the indication as a deviation of the default value.

In yet an alternative, the default value is set, by the RBS, as the same value as for the last downlink Physical Downlink Shared Channel, PDSCH, transmission that was acknowledged by the UE.

In still an alternative, the default value is set, by the RBS, as the same value as for the last Physical Uplink Shared Channel, PUSCH, transmission acknowledged by the RBS.

If the RBS changes the default value for the UE, the RBS informs the UE about the current default value by means of e.g. RRC configuration procedures, RRC signalling, a system information message, broadcasting and so on.

Using a default value has the advantage that the overhead may be reduced, especially in situations where a specific default value is more dominant than other default values. Then the UE only needs to send the indication whenever the priority level of service deviates from the default value.

In yet an example, the method comprises using two feedback bits of PUCCH format 1B for the extended scheduling request message, wherein one of the feedback bits is used to indicate the higher or lower priority level of service as compared to the default value.

As was described above, PUCCH format 1b has two bits, wherein using the PUCCH format 1b makes the indication more diverse. Therefore, the exemplifying cases, or situations, above with a possible deviation from the default value may be indicated using PUCHH format 1b instead of PUCCH format 1a.

Such a solution has the advantage that it is relatively simple to implement since multiple PUCCH transmissions need never be triggered by the same scheduling request if at most 1 HARQ feedback bit is to be transmitted.

In an example, the scheduling resource of the PUCCH is partitioned into at least two scheduling request resources, wherein the different partitions are associated with different types of service with regard to the logical channel group or the priority level of the service, wherein the method comprises transmitting the scheduling request on the scheduling request resource partition corresponding to the type of service for which the scheduling grant is requested, thereby providing the RBS with an indication of the type of service for which the scheduling grant is requested.

The RBS partitions in this example the scheduling resource of the PUCCH into at least two scheduling request resources. Once the UE becomes connected to the RBS, the RBS informs the UE of the partitioning of the scheduling resource of the PUCCH. The RBS may inform the UE by means of e.g. RRC configuration procedures, RRC signalling, a system information message and so on.

Once the UE is informed about the partitioning of the scheduling resource of the PUCCH, the UE makes use of the partitioning to indicate, to the RBS, which type of service for which the uplink resources are needed. The UE determines which type of service for which the uplink resources are needed and sends the scheduling request on the partition of the scheduling resource of the PUCCH which corresponds to the priority level of service associated with the type of service for which the uplink resources are needed.

In still an example, the method comprises transmitting the extended scheduling request message on the PUCCH using standardized PUCCH format 3, wherein at least one bit of the PUCCH format 3 is used to indicate the type of service for which the scheduling grant is requested.

With PUCCH format 3 and Quadrature Phase Shift Keying, QPSK, 48 bits are available per subframe for conveying ACK/NACK bits. This format is typically used for downlink carrier aggregation of more than two carriers and provides 1-2 HARQ feedback bits per component carrier. The format supports inclusion of an explicit scheduling bit, since the format is not possible to transmit on a scheduling request resource of the PUCCH.

In another example, the method comprises transmitting the scheduling request on PUCCH, using the structure of a Channel State Information, CSI report and on a CSI resource of the PUCCH.

As described above, the PUCCH has several resources, one being the above described scheduling request resource. Another example of a resource is the CSI resource.

CSI is generally used by the RBS to adapt to the radio channel conditions so that significant performance can be obtained. In order for the RBS to understand that a received message on the CSI resource of the PUCCH, a special format of may be defined to represent the scheduling request. In such a solution, the RBS may inform the UE by means of e.g. Non Access Stratum, NAS, signalling, RRC signalling, user-plane data and so on. An alternative is to use unused CSI resources for transmitting the scheduling request on a CSI resource, the scheduling request having the structure of a CSI report. This will be explained in more detail below.

Figure 1F:
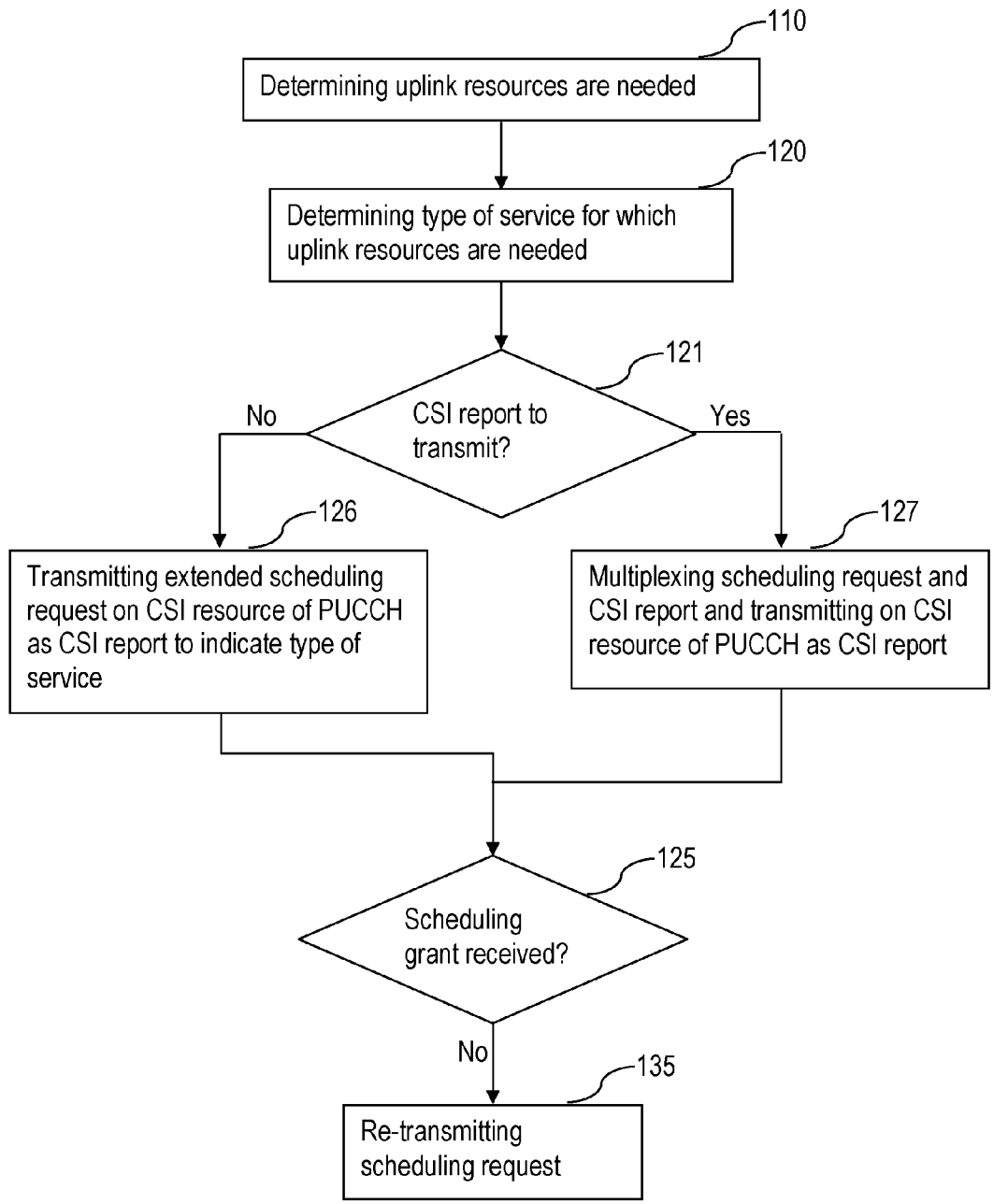
FIG. 1f is a flowchart of a method in a UE for requesting uplink resources from an RBS according to an exemplifying embodiment.

In an example illustrated in FIG. 1f, the method comprises transmitting 126 the scheduling request on the CSI resource when the UE has no CSI report to transmit to the RBS, or when the UE is in the Discontinuous Reception, DRX, mode.

In case the UE has no CSI report to transmit to the RBS, or when the UE is in the DRX mode, the CSI resources is not used and are therefore wasted. DRX is supported by almost every type of UE. Further, the traffic in a wireless communication network, or radio access network, is in general of a bursty nature. Due to the traffic having a bursty nature, the UE will be in the DRX mode quite often, resulting in that the probability that the UE does not need to send a CSI report is quite high. Instead of wasting the CSI resources when the UE does not need to send a CSI report, the UE sends a scheduling request on the CSI resource.

The number of payload bits in a CSI report is quite many, ranging from 6 to 11 bits depending on the CSI reporting mode. Some or all of these bits may then be used to define different patterns representing different service level priorities or different level of quality of service. These patterns are in one example defined by the RBS, or higher layer nodes, and communicated to the UE in order to inform the UE which patterns to use for the scheduling request by means of e.g. NAS signalling, RRC signalling, user-plane data and so on.

In yet an example, the method comprises multiplexing 127 the scheduling request and the CSI report and transmitting during the same time instant on the CSI resource of the PUCCH using the structure of the CSI report.

In case the UE does need to transmit a CSI report to the RBS, and if the UE at the same time wants, or needs, to send a scheduling request to the RBS, one alternative is to first send one and then send the other. However, in order to avoid any delays, the UE multiplexes the scheduling request and the CSI report together into one "message" and then transmits the multiplexed "message" to the RBS on the CSI resource of the PUCCH using the structure of the CSI report.

As described above, the traffic is of a bursty nature and hence it is not necessary to configure periodic scheduling requests. The rate with which the scheduling requests are sent are quite low and hence aperiodic sending of scheduling requests are sufficient. The occurrence of sending scheduling requests at the same time as when a CSI report needs to be sent is relatively rare, thereby the CSI performance will not be severely affected.

However, this multiplexed message, which comprises the scheduling request can be said to constitute a new type of scheduling request. As such, it needs to be distinguished from a normal CSI report as will be explained below.

In an example, the scheduling request comprises predefined information bits that are made available by applying a predefined codebook index restriction.

The RBS, or higher layer, may restrict the set of precoders which the UE can report, i.e. a codebook subset, or index, restriction. The codebook index restriction defines a subset of Pre-coding, Matrix, Indexes, PMIs, which may be used by the UE to report a pre-coder. Then the remaining codebook indexes are left for being used by the UE for indicating, to the RBS, which type of service for which the uplink resources are needed. The left-over PMIs may then further be defined such a plurality of individual PMIs correspond to a plurality of individual priority level of service or a quality level of service. The codebook index restriction is communicated to the UE by means of e.g. NAS signalling, RRC signalling, user-plane data and so on. In other words, when the RBS receives the scheduling request on a CSI resource of the PUCCH, the RBS is informed which type of service for which the uplink resources are needed by means of the Pre-coding, Matrix, Index, PMI, which is included in the scheduling request. The number of bits that may be used for the purpose of indicating, in the scheduling request, which type of service for which the uplink resources are needed are dependent on the number of unused PMIs that are available after the codebook index restriction.

In another example, the scheduling request comprises predefined Channel Quality Information, CQI, bits, wherein the predefined CQI bits are excluded from the available CQI bits and used for the indication.

The RBS, or higher layer, may determine that the UE is to use a coarser CQI granularity. There are a predefined number of CQI values or bits to be used for CQI purposes. The lower the number of values or bits, the coarser the CQI granularity. Merely as an example, assume there are maximum 4 bits to be used for CQI. The RBS, or higher layer, may determine that the UE is to use only 3 of these bits for CQI and that the remaining 1 bit is to be used in the scheduling request for indicating which type of service for which the uplink resources are needed. Alternatively, 1 bit is to be used for CQI and the remaining 3 bits are to be used in the scheduling request for indicating which type of service for which the uplink resources are needed.

Figure 2A:
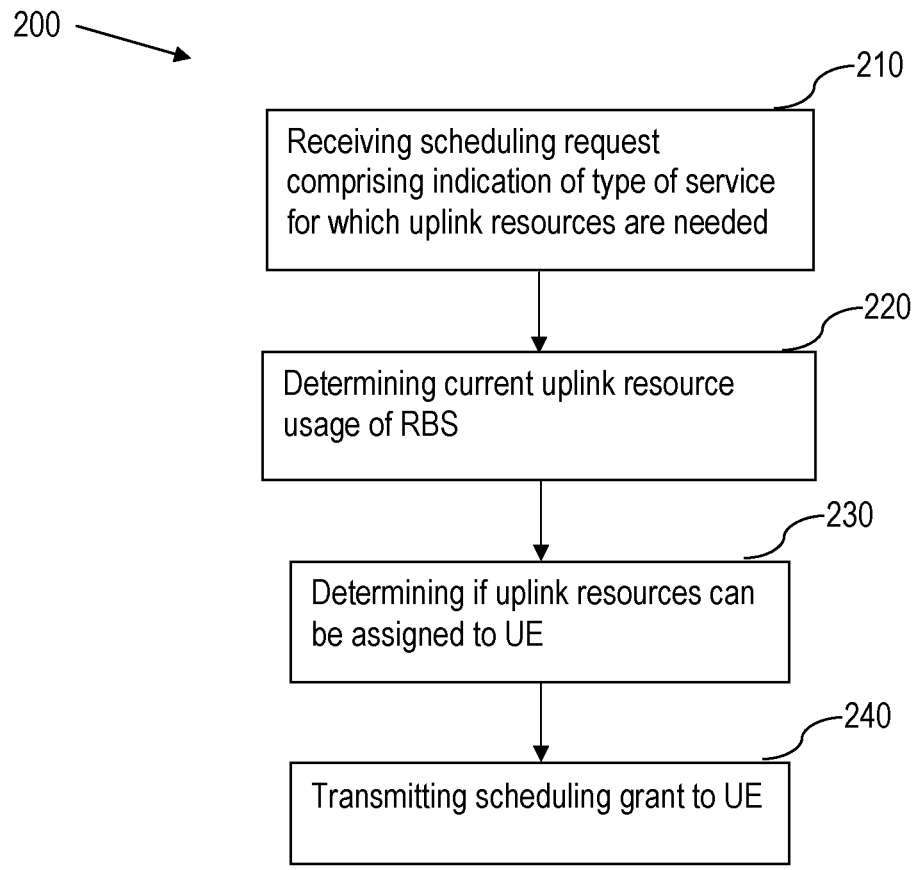
FIG. 2a is a flowchart of a method in an RBS for managing uplink resources within a coverage area of the RBS according to an exemplifying embodiment.

Embodiments herein also relate to a method in an RBS for managing uplink resources within a coverage area, or cell, of the RBS. Exemplifying embodiments of such a method will now be described with reference to FIG. 2a. FIG. 2a is a flowchart of a method in an RBS for managing uplink resources within a coverage area of the RBS according to an exemplifying embodiment.

FIG. 2a illustrates the method 200 in an RBS for managing uplink resources within a coverage area of the RBS comprising, receiving 210, from a UE a scheduling request comprising an indication of which type of service for which the scheduling grant is needed, and determining 220 a current uplink resource usage of the RBS. The method also comprises determining 230 a current uplink resource usage of the RBS, and transmitting 240 a scheduling grant to the UE, if uplink resources can be assigned to the UE.

In general, the RBS is responsible for granting, or denying, uplink resources to the UEs which are being served by the RBS. In order for a UE to transmit in uplink, the UE sends a scheduling request to the RBS informing the RBS that the UE is in need of uplink resources. FIG. 2 illustrates the RBS first receiving a scheduling request comprising an indication of which type of service for which the scheduling grant is needed. By this scheduling request, the RBS is informed that the UE is in need of uplink resources and the RBS is also informed of which type of service for which the scheduling grant is needed. The RBS also determines a current uplink resource usage of the RBS. With the information regarding which type of service for which the scheduling grant is needed and the current uplink resource usage of the RBS, the RBS is enabled to make a decision whether or not to grant the scheduling request. If uplink resources can be assigned to the UE, the RBS transmits a scheduling grant to the UE.

The method in the RBS has several advantages. By providing the RBS with the indication of the type of service for which the scheduling grant is requested, the RBS is enabled to make prioritisations between a plurality of incoming scheduling requests from different UEs. This may be particularly useful in situations where the load in the RBS is relatively high, wherein the RBS cannot simply grant all incoming requests from different UEs. By knowing the type of service for which the scheduling request is received, the RBS is enabled to determine e.g. how time critical the service is and then prioritise scheduling requests referring to relatively time critical services as compared to scheduling requests referring to services not being relatively time critical. In this manner, the RBS is enabled to make scheduling decisions for the benefit of both the wireless communication network in which the RBS is deployed as well as end-user performance.

In an example, the method comprises receiving the scheduling request on a scheduling request resource of a PUCCH and is received as an extended scheduling request message having a structure of a HARQ feedback message.

In general, the PUCCH has different resources, whereof the scheduling request resource is one. The UE sends the scheduling request on this scheduling request resource of the PUCCH as an extended scheduling request message having a structure of a HARQ feedback message. The RBS receives the scheduling request on the scheduling request resource of the PUCCH and is thereby informed of the type of service for which the scheduling grant is requested.

In yet an example, the method comprises receiving the extended scheduling request message is received on the scheduling request resource of the standardized PUCCH and is of PUCCH format 1a or 1b.

There are different standardised PUCCH formats whereof 1a and 1b are two different formats. PUCCH format 1a comprises one explicit bit and PUCCH format 1b has two explicit bits. There is also a PUCCH format 1 which has no bits but the information is carried by the presence/absence of transmission of PUCCH from the UE.

With PUCCH format 1a, the explicit bit is used to indicate, to the RBS, which type of service for which the uplink resources are needed. Since there is only one bit and this bit can have two different values "0" or "1", the indication can take two values.

With PUCCH format 1b, the explicit two bits may be used to indicate, to the RBS, which type of service for which the uplink resources are needed. Since there are two bits, each being able to take the two different values "0" or "1", the indication can take four values.

As can be seen above, with PUCCH format 1b, the indication may be more diverse if both bits are used as compared to PUCCH format 1a.

In still an example, at least one bit of the extended scheduling request message indicates the type of service for which the scheduling grant is requested.

As described above, depending on the PUCCH format used, there are different numbers of available bits to be used to indicate the type of service for which the scheduling grant is requested.

Figure 2B:
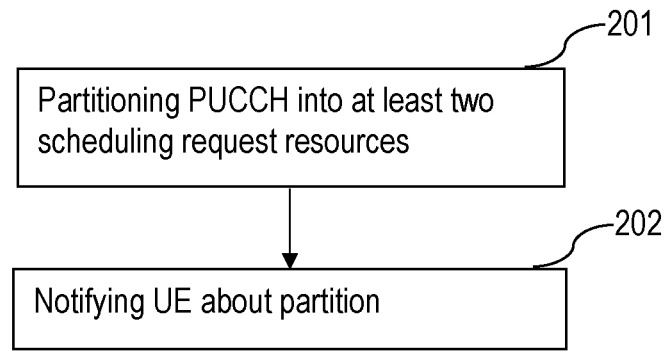
FIG. 2b is a flowchart of a method in an RBS for managing uplink resources within a coverage area of the RBS according to an exemplifying embodiment.

In another example illustrated in FIG. 2b, the method further comprises partitioning 201 the PUCCH into at least two scheduling request resources, wherein the different partitions are associated with different types of service with regard to a logical channel group or priority level of the service, notifying 202 the UE about the partition and receiving 210 the scheduling request on a scheduling request resource partition corresponding to the type of service for which the scheduling grant is requested.

The RBS may partition the scheduling resource of the PUCCH into at least two scheduling request resources. Once the UE becomes connected to the RBS, the RBS informs the UE of the partitioning of the scheduling resource of the PUCCH. The RBS may inform the UE by means of e.g. RRC configuration procedures, RRC signalling, a system information message and so on.

Once the UE is informed about the partitioning of the scheduling resource of the PUCCH, the UE makes use of the partitioning to indicate, to the RBS, which type of service for which the uplink resources are needed. The UE determines which type of service for which the uplink resources are needed and sends the scheduling request on the partition of the scheduling resource of the PUCCH which corresponds to the priority level of service associated with the type of service for which the uplink resources are needed.

Figure 2C:
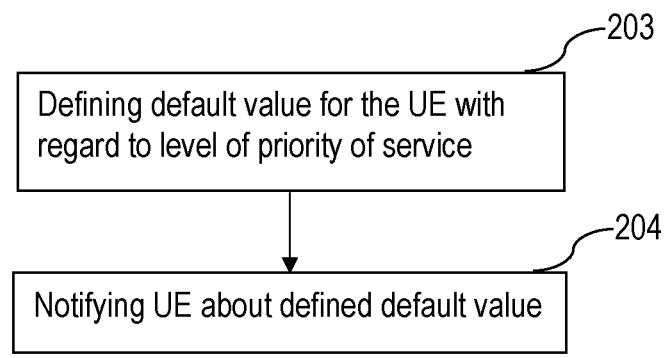
FIG. 2c is a flowchart of a method in an RBS for managing uplink resources within a coverage area of the RBS according to an exemplifying embodiment.

FIG. 2c illustrates that once the UE becomes connected to the RBS, the RBS assigns 203, or defines, a default value for the UE relating to a priority level of service. The RBS informs 204 the UE of the default value that the RBS has assigned to the UE. The RBS may perform the information of the UE by means of e.g. RRC configuration procedures, RRC signalling, a system information message, broadcasting and so on.

In still an example, the method comprises receiving the scheduling request on PUCCH having the structure of a Channel State Information, CSI, report.

As described above, the PUCCH has several resources, one being the above described scheduling request resource. Another example of a resource is the CSI resource.

CSI reports are generally used by the RBS to adapt to the radio channel conditions so that significant performance can be obtained. In order for the RBS to understand that a received message on the CSI resource of the PUCCH comprises a scheduling request, a special format of may be defined to represent the scheduling request. In such a solution, the RBS may inform the UE by means of e.g. NAS signalling, RRC signalling, a system information message, broadcasting and so on. An alternative is to use unused CSI resources for transmitting the scheduling request on a CSI resource, the scheduling request having the structure of a CSI report.

Embodiments herein also relate to a UE adapted to request uplink resources from an RBS in a wireless communication network. The UE has the same object, technical features and advantages as the method performed therein described above. The UE will be described in brief in order to avoid unnecessary repetition.

Such a UE will now be described with reference to FIG. 3, which is a block diagram of a UE adapted to request uplink resources from an RBS according to an exemplifying embodiment.

Figure 3:
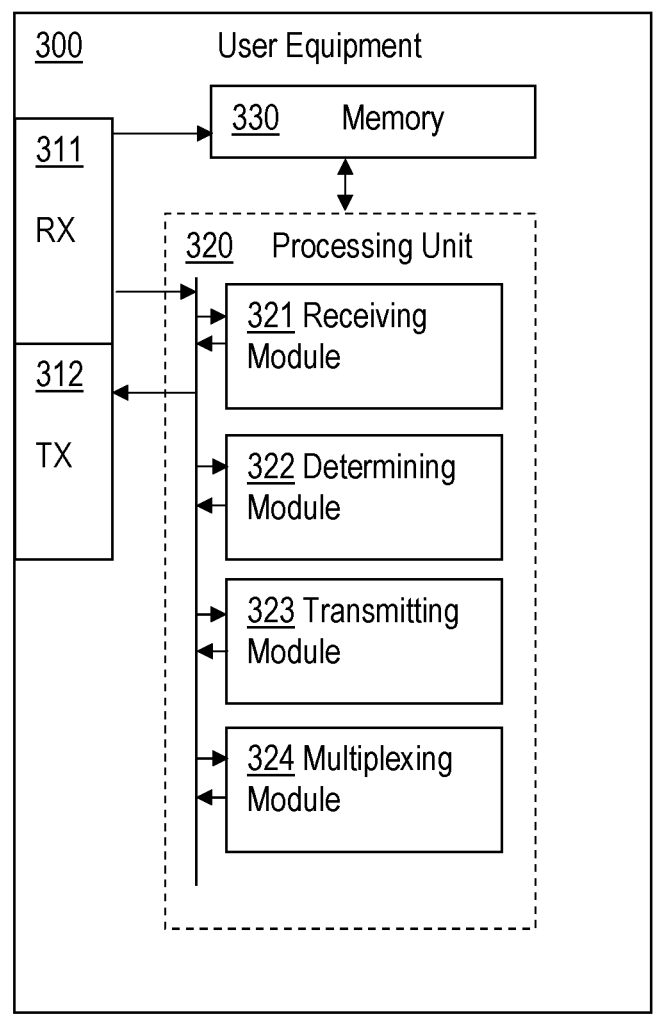
FIG. 3 is a block diagram of a UE adapted to request uplink resources from an RBS according to an exemplifying embodiment.

FIG. 3 illustrates the UE 300 comprising a determining module 322 adapted to determine that uplink resources are needed and which type of service for which the uplink resources are needed, and a transmitting module 323 adapted to transmit, to the RBS, a scheduling request for a scheduling grant, the scheduling request comprising an indication of the type of service for which the scheduling grant is requested.

The UE has several advantages. By providing the RBS with the indication of the type of service for which the scheduling grant is requested, the RBS is enabled to make prioritisations between a plurality of incoming scheduling requests from different UEs. This may be particularly useful in situations where the load in the RBS is relatively high, wherein the RBS cannot simply grant all incoming requests from different UEs. By knowing the type of service for which the scheduling request is received, the RBS is enabled to determine e.g. how time critical the service is and then prioritise scheduling requests referring to relatively time critical services as compared to scheduling requests referring to services not being relatively time critical. In this manner, the RBS is enabled to make scheduling decisions for the benefit of both the wireless communication network in which the RBS is deployed as well as end-user performance.

In FIG. 3, the UE is also illustrated comprising a receiving unit 311 and a transmitting unit 312. Through these two units, the UE is adapted to communicate with the RBS. The receiving unit 311 may comprise more than one receiving arrangement. Similarly, the transmitting unit 312 may comprise more than one transmitting arrangement. The UE further comprises a memory 330 for storing data. Further, the UE is illustrated comprising a processing unit 320 which in turns comprises the different units 321-324. It shall be pointed out that this is merely an illustrative example and the UE may comprise more, less or other units or modules which execute the functions of the UE in the same manner as the units and modules illustrated in FIG. 3.

In an example, the indication of the type of service for which the scheduling grant is requested comprises information on a logical channel group comprising a set of logical channels with similar quality of service characteristics, or a priority level of the service.

In still an example, the transmitting module 323 is adapted to transmit the scheduling request on a scheduling request resource of a PUCCH and to transmit it as an extended scheduling request message having a structure of a HARQ feedback message.

In yet an example, the transmitting module 323 is adapted to transmit the extended scheduling request message on the scheduling request resource of the PUCCH using standardized PUCCH format 1a or 1b.

In another example, if the UE does not have HARQ feedback to transmit to the RBS, then the transmitting module 323 is adapted to transmit the extended scheduling request message on the scheduling request resource of the PUCCH using standardized PUCCH format 1a or 1b wherein at least one bit of the extended scheduling request message is used to indicate the type of service for which the scheduling grant is requested.

In still an example, if the UE has HARQ feedback to transmit to the RBS, then the transmitting module 323 is adapted to transmit a HARQ feedback message on a non scheduling request resource of the PUCCH and thereafter to transmit the extended scheduling request message on the scheduling request resource of the PUCCH using standardized PUCCH format 1a or 1b.

In yet an example, if the UE has HARQ feedback to transmit to the RBS, then the transmitting module 323 is adapted to first transmit the extended scheduling request message on the scheduling request resource of the PUCCH using standardized PUCCH format 1a or 1b and thereafter to transmit a HARQ feedback message on a non scheduling request resource of the PUCCH.

In another example, if the UE has HARQ feedback to transmit to the RBS, then the transmitting module 323 is adapted to transmit the extended scheduling request message on the scheduling request resource of the PUCCH using standardized PUCCH format 1a or 1b and to simultaneously transmit as a HARQ feedback on a non scheduling request resource of the PUCCH.

Further, in an example, if no scheduling grant is received by the UE from the RBS, then the transmitting module 323 is adapted to re-transmit the scheduling request.

In still an example, a default value is defined for the UE, the default value relating to a priority level of service, wherein the extended scheduling request message on the scheduling request resource of the PUCCH indicates a deviation from the default value.

In another example, the UE 300 is configured to use standardized PUCCH format 1B comprising two feedback bits for the extended scheduling request message, wherein one of the feedback bits is used to indicate the higher or lower priority level of service as compared to the default value.

In yet an example, the scheduling resource of the PUCCH is partitioned into at least two scheduling request resources, wherein the different partitions are associated with different types of service with regard to the logical channel group or the priority level of the service. The transmitting module 323 is adapted to transmit the scheduling request on the scheduling request resource partition corresponding to the type of service for which the scheduling grant is requested, thereby providing the RBS with an indication of the type of service for which the scheduling grant is requested.

Further, in an example, the transmitting module 323 is adapted to transmit the extended scheduling request message on the PUCCH using standardized PUCCH format 3, wherein at least one bit of the PUCCH format 3 is used to indicate the type of service for which the scheduling grant is requested.

In another example, the transmitting module 323 is adapted to transmit the scheduling request on Physical Uplink Control Channel, PUCCH, using the structure of a Channel State Information, CSI report and on a CSI resource of the PUCCH.

In still an example, the transmitting module 323 is adapted to transmit the scheduling request on the CSI resource when the UE has no CSI report to transmit to the RBS, or when the UE is the DRX mode.

In yet an example, the UE 300 further comprises a multiplexing module 324 configured for multiplexing the scheduling request and the CSI report, wherein the transmitting module 323 is adapted to transmit the multiplexed scheduling request and CSI report on the CSI resource of the PUCCH using the structure of the CSI report when the UE has CSI reports to transmit to the RBS.

In an example, the scheduling request comprises predefined information bits that are made available by applying a predefined codebook index restriction.

Further, in still an example, the scheduling request comprises predefined CQI bits, wherein the predefined CQI bits are excluded from the available CQI bits and used for the indication.

It should be noted that FIG. 3 merely illustrates various functional units in the UE in a logical sense. The functions in practice may be implemented using any suitable software and hardware means/circuits etc. Thus, the embodiments are generally not limited to the shown structures of the UE and the functional units. Hence, the previously described exemplary embodiments may be realised in many ways. For example, one embodiment includes a computer-readable medium having instructions stored thereon that are executable by the processing unit for executing the method steps in the UE. The instructions executable by the computing system and stored on the computer-readable medium perform the method steps as set forth in the claims.

FIG. 3 schematically shows an embodiment of a UE 300. Comprised in the UE 300 are here a processing unit 320, e.g. with a DSP (Digital Signal Processor). The processing unit 320 may be a single unit or a plurality of units to perform different actions of procedures described herein. The UE 300 may also comprise an input unit for receiving signals from other entities, and an output unit for providing signal(s) to other entities. The input unit and the output unit may be arranged as an integrated entity or as illustrated in the example of FIG. 3, as one or more interfaces 311 and 312.

Furthermore, the UE 300 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 320 in the UE 300 causes the UE 300 to perform the actions e.g. of the procedure described earlier in conjunction with FIGS. 1a-f.

The computer program may be configured as a computer program code structured in computer program modules. Hence, in an exemplifying embodiment, the code means in the computer program of the UE 300 comprises a determining module for determining that uplink resources are needed and which type of service for which the uplink resources are needed. The computer program further comprises a transmitting module for transmitting, to the RBS, a scheduling request for a scheduling grant, the scheduling request comprising an indication of the type of service for which the scheduling grant is requested.

The computer program modules could essentially perform the actions of the flow illustrated in FIGS. 1a-f, to emulate the UE 300. In other words, when the different computer program modules are executed in the processing unit 320, they may correspond to the modules 321-324 of FIG. 3.

Although the code means in the embodiment disclosed above in conjunction with FIG. 3 are implemented as computer program modules which when executed in the processing unit 320 causes the UE 300 to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the UE 300.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

Embodiments herein also relate to an RBS adapted to manage uplink resources within a coverage area of the RBS. The RBS has the same object, technical features and advantages as the method performed therein described above. The RBS will be described in brief in order to avoid unnecessary repetition.

Such an RBS will now be described with reference to FIG. 4, which is a block diagram of an RBS adapted to manage uplink resources within a coverage area of the RBS according to an exemplifying embodiment.

Figure 4:
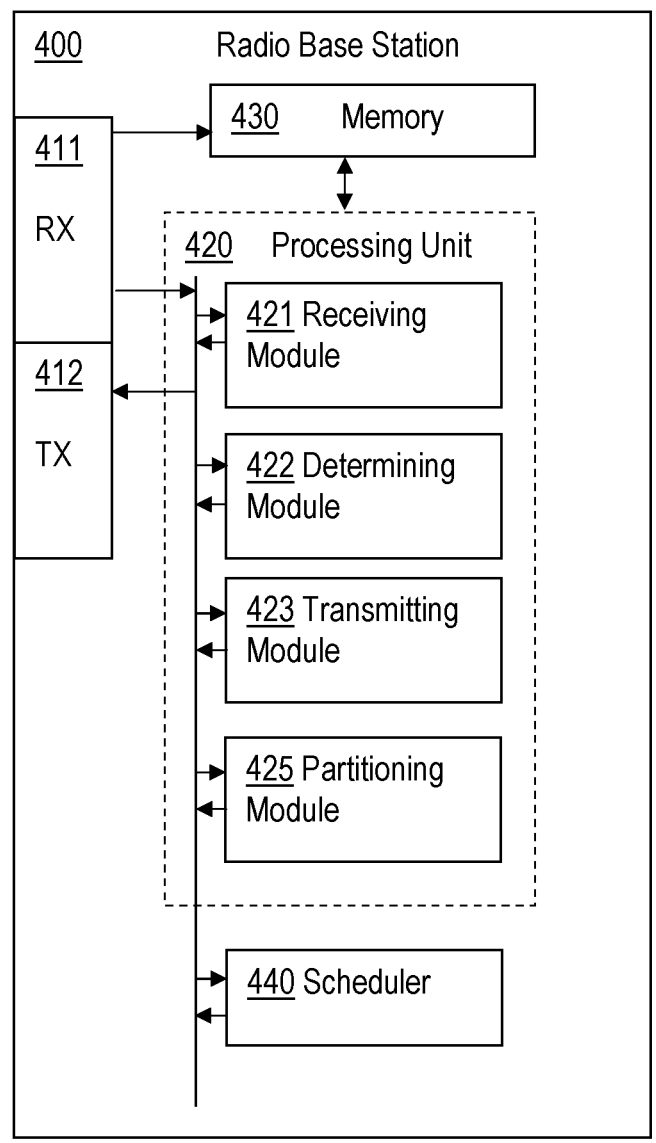
FIG. 4 is a block diagram of an RBS adapted to manage uplink resources within a coverage area of the RBS according to an exemplifying embodiment.

FIG. 4 illustrates the RBS 400 comprising a receiving module 421 adapted to receive, from a UE a scheduling request comprising an indication of which type of service for which the scheduling grant is needed. The RBS 400 also comprises a determining module 422 adapted to determine a current uplink resource usage of the RBS, and to determine, based on the indication in the scheduling request and the current uplink resource usage, if uplink resources can be assigned to the UE. Further, the RBS comprises a transmitting module 423 adapted to transmit a scheduling grant to the UE, if uplink resources may be assigned to the UE.

The RBS has several advantages. By the RBS being provided with the indication of the type of service for which the scheduling grant is requested, the RBS is enabled to make prioritisations between a plurality of incoming scheduling requests from different UEs. This may be particularly useful in situations where the load in the RBS is relatively high, wherein the RBS cannot simply grant all incoming requests from different UEs. By knowing the type of service for which the scheduling request is received, the RBS is enabled to determine e.g. how time critical the service is and then prioritise scheduling requests referring to relatively time critical services as compared to scheduling requests referring to services not being relatively time critical. In this manner, the RBS is enabled to make scheduling decisions for the benefit of both the wireless communication network in which the RBS is deployed as well as end-user performance.

In FIG. 4, the RBS is also illustrated comprising a receiving unit 411 and a transmitting unit 412. Through these two units, the low power RBS is adapted to communicate with other nodes and/or entities in the wireless communication network, e.g. UEs and neighbouring RBSs. The receiving unit 411 may comprise more than one receiving arrangement. For example, the receiving unit may be connected to both a wire and an antenna, by means of which the RBS is enabled to communicate with other nodes and/or entities in the wireless communication network. Similarly, the transmitting unit 412 may comprise more than one transmitting arrangements, which in turn are connected to both a wire and an antenna, by means of which the RBS is enabled to communicate with other nodes and/or entities in the wireless communication network. The RBS further comprises a memory 430 for storing data. Further, the low power RBS is illustrated comprising a processing unit 420 which in turns comprises the different modules 421-425. It shall be pointed out that this is merely an illustrative example and the RBS may comprise more, less or other units or modules which execute the functions of the RBS in the same manner as the units illustrated in FIG. 4.

In an example, the receiving module 421 is adapted to receive the scheduling request on a scheduling request resource of a PUCCH and to receive the scheduling request as an extended scheduling request message having a structure of a HARQ feedback message.

In still an example, the receiving module 421 is adapted to receive the extended scheduling request message on the scheduling request resource of the PUCCH and the extended scheduling request being of standardized PUCCH format 1a or 1b.

Further, in an example, at least one bit of the extended scheduling request message indicates the type of service for which the scheduling grant is requested.

In another example, the RBS further comprises a partitioning module 425 configured for partitioning the PUCCH into at least two scheduling request resources, wherein the different partitions are associated with different types of service with regard to a logical channel group or priority level of the service. The transmitting module 423 is configured for notifying the UE about the partitioning, wherein the receiving module 421 adapted to receive the scheduling request on the scheduling request resource partition corresponding to the type of service for which the scheduling grant is requested.

In yet an example, the receiving module 421 adapted to receive the scheduling request on a PUCCH, the scheduling request having the structure of a CSI report.

It should be noted that FIG. 4 merely illustrates various functional units in the RBS in a logical sense. The functions in practice may be implemented using any suitable software and hardware means/circuits etc. Thus, the embodiments are generally not limited to the shown structures of the RBS and the functional units. Hence, the previously described exemplary embodiments may be realised in many ways. For example, one embodiment includes a computer-readable medium having instructions stored thereon that are executable by the processing unit for executing the method steps in the RBS. The instructions executable by the computing system and stored on the computer-readable medium perform the method steps as set forth in the claims.

FIG. 4 schematically shows an embodiment of an RBS 400. Comprised in the RBS 400 are here a processing unit 420, e.g. with a DSP (Digital Signal Processor). The processing unit 420 may be a single unit or a plurality of units to perform different actions of procedures described herein. The RBS 400 may also comprise an input unit for receiving signals from other entities, and an output unit for providing signal(s) to other entities. The input unit and the output unit may be arranged as an integrated entity or as illustrated in the example of FIG. 4, as one or more interfaces 411 and 412.

Furthermore, the RBS 400 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 420 in the RBS 400 causes the RBS 400 to perform the actions e.g. of the procedure described earlier in conjunction with FIGS. 2a-c.

The computer program may be configured as a computer program code structured in computer program modules. Hence, in an exemplifying embodiment, the code means in the computer program of the RBS 400 comprises a receiving module for receiving, from a UE, a scheduling request comprising an indication of which type of service for which the scheduling grant is needed. The computer program further comprises a determining module for determining a current uplink resource usage of the RBS, and for determining, based on the indication in the scheduling request and the current uplink resource usage, if uplink resources can be assigned to the UE. Still further, the computer program comprises a transmitting module for transmitting a scheduling grant to the UE, if uplink resources may be assigned to the UE.

The computer program modules could essentially perform the actions of the flow illustrated in FIGS. 2a-c, to emulate the RBS 400. In other words, when the different computer program modules are executed in the processing unit 420, they may correspond to the modules 421-425 of FIG. 4.

Although the code means in the embodiment disclosed above in conjunction with FIG. 4 are implemented as computer program modules which when executed in the processing unit 420 causes the RBS 400 to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the RBS 400.

It is to be understood that the choice of interacting units, as well as the naming of the units, and modules, within this disclosure are only for exemplifying purpose, and nodes suitable to execute any of the methods described above may be configured in a plurality of alternative ways in order to be able to execute the suggested procedure actions.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a User Equipment, UE, for requesting uplink resources from a Radio Base Station, RBS, in a wireless communication network, the method comprising:
   determining that the uplink resources are needed,
   determining which type of service for which the uplink resources are needed, and
   transmitting, to the RBS, a scheduling request for a scheduling grant on a scheduling request resource of a Physical Uplink Control Channel, PUCCH, as an extended scheduling request message having a structure of a Hybrid Automatic Repeat Request HARQ feedback message, said scheduling request comprising an indication of the type of service for which the scheduling grant is requested.

2. A method according to claim 1, wherein the indication comprises information on a logical channel group comprising a set of logical channels with similar quality of service characteristics, or a priority level of the service.

3. A method according to claim 1, comprising sending the extended scheduling request message on the scheduling request resource of the PUCCH using standardized PUCCH format 1a or 1b.

4. A method according to claim 3, wherein if the UE does not have HARQ feedback to transmit to the RBS, then transmitting the extended scheduling request message on the scheduling request resource of the PUCCH using standardized PUCCH format 1a or 1b wherein at least one bit of the extended scheduling request message is used to indicate the type of service for which the scheduling grant is requested.

5. A method according to claim 3, wherein if the UE has HARQ feedback to transmit to the RBS, then transmitting a HARQ feedback on a non scheduling request resource of the PUCCH and thereafter the extended scheduling request message is transmitted on the scheduling request resource of the PUCCH using standardized PUCCH format 1a or 1b.

6. A method according to claim 3, wherein if the UE has HARQ feedback to transmit to the RBS, then first transmitting the extended scheduling request message on the scheduling request resource of the PUCCH using standardized PUCCH format 1a or 1b and thereafter transmitting a HARQ feedback message on a non scheduling request resource of the PUCCH.

7. A method according to claim 3, wherein if the UE has HARQ feedback to transmit to the RBS, then transmitting the extended scheduling request message on the scheduling request resource of the PUCCH using standardized PUCCH format 1a or 1b simultaneously as transmitting a HARQ feedback on a non scheduling request resource of the PUCCH.

8. A method according to claim 3, wherein a default value is defined for the UE, the default value relating to a priority level of service, wherein the extended scheduling request message on the scheduling request resource of the PUCCH indicates a deviation from the default value.

9. A method according to claim 8, comprising using two feedback bits of PUCCH format 1b for the extended scheduling request message, wherein one of the feedback bits is used to indicate said higher or lower priority level of service as compared to the default value.

10. A method according to claim 3, wherein the scheduling resource of the PUCCH is partitioned into at least two scheduling request resources, wherein the different partitions are associated with different types of service with regard to the logical channel group or the priority level of the service, wherein the method comprises transmitting the scheduling request on the scheduling request resource partition corresponding to the type of service for which the scheduling grant is requested, thereby providing the RBS with an indication of the type of service for which the scheduling grant is requested.

11. A method according to claim 1, further comprising retransmitting the scheduling request in case no scheduling grant is received from the RBS.

12. A method according to claim 1, comprises transmitting the extended scheduling request message on the PUCCH using standardized PUCCH format 3, wherein at least one bit of the PUCCH format 3 is used to indicate the type of service for which the scheduling grant is requested.

13. A method in a User Equipment, UE, for requesting uplink resources from a Radio Base Station, RBS, in a wireless communication network, the method, comprising:
   determining that the uplink resources are needed,
   determining which type of service for which the uplink resources are needed, and
   transmitting, to the RBS, a scheduling request on a Physical Uplink Control Channel, PUCCH, using the structure of a Channel State Information, CSI report and on a CSI resource of the PUCCH, said scheduling request comprising an indication of the type of service for which the scheduling grant is requested.

14. A method according to claim 13, comprises transmitting the scheduling request on the CSI resource when the UE has no CSI report to transmit to the RBS, or when the UE is in the Discontinuous Reception, DRX, mode.

15. A method according to claim 13, comprising multiplexing the scheduling request and the CSI report and transmitting during the same time instant on the CSI resource of the PUCCH using the structure of the CSI report.

16. A method according to claim 15, wherein the scheduling request comprises predefined information bits that are made available by applying a predefined codebook index restriction.

17. A method according to claim 15, wherein the scheduling request comprises predefined Channel Quality Information, CQI, bits, wherein the predefined CQI bits are excluded from the available CQI bits and used for the indication.

18. A method in a Radio Base Station, RBS, for managing uplink resources within a coverage area of the RBS, the method comprising:
   receiving, from a User Equipment, UE, a scheduling request comprising an indication of which type of service for which the scheduling grant is needed, the scheduling request received on a scheduling request resource of a Physical Uplink Control Channel, PUCCH, as an extended scheduling request message having a structure of a Hybrid Automatic Repeat Request HARQ feedback message,
   determining a current uplink resource usage of the RBS,
   determining, based on the indication in the scheduling request and the current uplink resource usage, if uplink resources can be assigned to the UE, and
   transmitting a scheduling grant to the UE, if the uplink resources can be assigned to the UE.

19. A method according to claim 18, comprising receiving the extended scheduling request message is received on the scheduling request resource of the standardized PUCCH and is of PUCCH format 1a or 1b.

20. A method according to claim 18, wherein at least one bit of the extended scheduling request message indicates the type of service for which the scheduling grant is requested.

21. A method according to claim 18, further comprising partitioning the PUCCH into at least two scheduling request resources, wherein the different partitions are associated with different types of service with regard to a logical channel group or priority level of the service, notifying the UE about the partition and receiving the scheduling request on a scheduling request resource partition corresponding to the type of service for which the scheduling grant is requested.

22. A method in a Radio Base Station, RBS, for managing uplink resources within a coverage area of the RBS, the method comprising:
   receiving, from a User Equipment, UE, a scheduling request comprising an indication of which type of service for which the scheduling grant is needed, wherein the scheduling request is received on a Physical Uplink Control Channel, PUCCH, having the structure of a Channel State Information, CSI, report determining a current uplink resource usage of the RBS, determining, based on the indication in the scheduling request and the current uplink resource usage, if uplink resources can be assigned to the UE, and transmitting a scheduling grant to the UE, if the uplink resources can be assigned to the UE.

23. A User Equipment, UE, adapted to request uplink resources from a Radio Base Station, RBS, in a wireless communication network, the UE comprising:

a determining module adapted to determine that the uplink resources are needed and which type of service for which the uplink resources are needed, and a transmitting module adapted to transmit, to the RBS, a scheduling request for a scheduling grant on a scheduling request resource of a Physical Uplink Control Channel, PUCCH, as an extended scheduling request message having a structure of a Hybrid Automatic Repeat Request HARQ feedback message, said scheduling request comprising an indication of the type of service for which the scheduling grant is requested.

24. A UE according to claim 23, wherein the indication of the type of service for which the scheduling grant is requested comprises information on a logical channel group comprising a set of logical channels with similar quality of service characteristics, or a priority level of the service.

25. A UE according to claim 23, wherein the transmitting module is adapted to transmit the extended scheduling request message on the scheduling request resource of the PUCCH using standardized PUCCH format 1a or 1b.

26. A UE according to claim 25, wherein if the UE does not have HARQ feedback to transmit to the RBS, then the transmitting module is adapted to transmit the extended scheduling request message on the scheduling request resource of the PUCCH using standardized PUCCH format 1a or 1b wherein at least one bit of the extended scheduling request message is used to indicate the type of service for which the scheduling grant is requested.

27. A UE according to claim 26, wherein if no scheduling grant is received by the UE from the RBS, then the transmitting module is adapted to re-transmit the scheduling request.

28. A UE according to claim 25, wherein if the UE has HARQ feedback to transmit to the RBS, then the transmitting module is adapted to transmit a HARQ feedback message on a non scheduling request resource of the PUCCH and thereafter to transmit the extended scheduling request message on the scheduling request resource of the PUCCH using standardized PUCCH format 1a or 1b.

29. A UE according to claim 25, wherein if the UE has HARQ feedback to transmit to the RBS, then the transmitting module is adapted to first transmit the extended scheduling request message on the scheduling request resource of the PUCCH using standardized PUCCH format 1a or 1b and thereafter to transmit a HARQ feedback message on a non scheduling request resource of the PUCCH.

30. A UE according to claim 25, wherein if the UE has HARQ feedback to transmit to the RBS, then the transmitting module is adapted to transmit the extended scheduling request message on the scheduling request resource of the PUCCH using standardized PUCCH format 1a or 1b and to simultaneously transmit as a HARQ feedback on a non scheduling request resource of the PUCCH.

31. A UE according to claim 25, wherein a default value is defined for the UE, the default value relating to a priority level of service, wherein the extended scheduling request message on the scheduling request resource of the PUCCH indicates a deviation from the default value.

32. A UE according to claim 31, being configured to use standardized PUCCH format 1B comprising two feedback bits for the extended scheduling request message, wherein one of the feedback bits is used to indicate said higher or lower priority level of service as compared to the default value.

33. A UE according to claim 25, wherein the scheduling resource of the PUCCH is partitioned into at least two scheduling request resources, wherein the different partitions are associated with different types of service with regard to the logical channel group or the priority level of the service, wherein the transmitting module is adapted to transmit the scheduling request on the scheduling request resource partition corresponding to the type of service for which the scheduling grant is requested, thereby providing the RBS with an indication of the type of service for which the scheduling grant is requested.

34. A UE according to claim 23, wherein the transmitting module is adapted to transmit the extended scheduling request message on the PUCCH using standardized PUCCH format 3, wherein at least one bit of the PUCCH format 3 is used to indicate the type of service for which the scheduling grant is requested.

35. A User Equipment, UE, adapted to request uplink resources from a Radio Base Station, RBS, in a wireless communication network, the UE comprising:

a determining module adapted to determine that the uplink resources are needed and which type of service for which the uplink resources are needed, and a transmitting module adapted to transmit, to the RBS, a scheduling request for a scheduling grant on a Physical Uplink Control Channel, PUCCH, using the structure of a Channel State Information, CSI report and on a CSI resource of the PUCCH, said scheduling request comprising an indication of the type of service for which the scheduling grant is requested.

36. A UE according to claim 35, wherein the transmitting module is adapted to transmit the scheduling request on the CSI resource when the UE has no CSI report to transmit to the RBS, or when the UE is the Discontinuous Reception, DRX, mode.

37. A UE according to claim 35, further comprising a multiplexing module configured for multiplexing the scheduling request and the CSI report, wherein the transmitting module is adapted to transmit the multiplexed scheduling request and CSI report on the CSI resource of the PUCCH using the structure of the CSI report when the UE has CSI reports to transmit to the RBS.

38. A UE according to claim 37, wherein the scheduling request comprises predefined information bits that are made available by applying a predefined codebook index restriction.

39. A UE according to claim 37, wherein the scheduling request comprises predefined Channel Quality Information, CQI, bits, wherein the predefined CQI bits are excluded from the available CQI bits and used for the indication.

40. A Radio Base Station, RBS, adapted to manage uplink resources within a coverage area of the RBS, the RBS comprising:

a receiving module adapted to receive, from a User Equipment, UE, a scheduling request comprising an indication of which type of service for which the scheduling grant is needed, the scheduling request received on a scheduling request resource of a Physical Uplink Control Channel, PUCCH, as an extended scheduling request message having a structure of a Hybrid Automatic Repeat Request HARQ feedback message,
- a determining module adapted to determine a current uplink resource usage of the RBS, and to determine, based on the indication in the scheduling request and the current uplink resource usage, if the uplink resources can be assigned to the UE, and
- a transmitting module adapted to transmit a scheduling grant to the UE, if the uplink resources may be assigned to the UE.

41. An RBS according to claim 40, wherein the receiving module is adapted to receive the extended scheduling request message on the scheduling request resource of the PUCCH and the extended scheduling request being of standardized PUCCH format 1a or 1b.

42. An RBS according to claim 40, wherein at least one bit of the extended scheduling request message indicates the type of service for which the scheduling grant is requested.

43. An RBS according to claim 40, further comprising a partitioning module configured for partitioning the PUCCH into at least two scheduling request resources, wherein the different partitions are associated with different types of service with regard to a logical channel group or priority level of the service, wherein the transmitting module is configured for notifying the UE about the partitioning, wherein the receiving module adapted to receive the scheduling request on the scheduling request resource partition corresponding to the type of service for which the scheduling grant is requested.

44. A Radio Base Station, RBS, adapted to manage uplink resources within a coverage area of the RBS, the RBS comprising:
- a receiving module adapted to receive, from a User Equipment, UE, a scheduling request comprising an indication of which type of service for which the scheduling grant is needed, wherein the receiving module is adapted to receive the scheduling request on a Physical Uplink Control Channel, PUCCH, the scheduling request having the structure of a Channel State Information, CSI, report,
- a determining module adapted to determine a current uplink resource usage of the RBS, and to determine, based on the indication in the scheduling request and the current uplink resource usage, if uplink resources can be assigned to the UE, and
- a transmitting module adapted to transmit a scheduling grant to the UE if the uplink resources may be assigned to the UE.

* * * * *